United States Patent [19]

Mir

[11] 4,285,588
[45] Aug. 25, 1981

[54] APPARATUS AND METHOD FOR MINIMIZING RED-EYE IN FLASH PHOTOGRAPHY

[75] Inventor: Jose M. Mir, Rochester, N.Y.

[73] Assignee: Eastman Kodak Company, Rochester, N.Y.

[21] Appl. No.: 171,639

[22] Filed: Jul. 24, 1980

[51] Int. Cl.³ .............................................. G03B 15/03
[52] U.S. Cl. ..................................... 354/137; 354/33; 354/35; 354/126; 354/145; 354/354
[58] Field of Search .................. 354/126, 137, 145, 33, 354/35

[56] References Cited

U.S. PATENT DOCUMENTS

| | | | |
|---|---|---|---|
| 3,648,104 | 3/1972 | Ackermann | 315/151 |
| 3,681,649 | 8/1972 | Uno et al. | 315/151 |
| 3,684,917 | 8/1972 | Uno et al. | 315/151 |
| 3,706,266 | 12/1972 | Uno et al. | |
| 3,709,123 | 1/1973 | Tokutomi | 354/33 |
| 3,716,752 | 2/1973 | Iwata | 315/151 |
| 3,943,532 | 3/1976 | De Filippis | 354/126 |

FOREIGN PATENT DOCUMENTS 1462987  1/1977  United Kingdom .

OTHER PUBLICATIONS

"The Red Eye Effect" by Oran E. Miller, PSA Journal, Jul. 1952, pp. 425+.

Primary Examiner—Russell E. Adams
Attorney, Agent, or Firm—John D. Husser

[57] ABSTRACT

Apparatus and method for minimizing a red-dot artifact in the eye of a flash photograph subject employs a subject conditioning pre-flash, predeterminedly preceding the camera picture-taking operation, to reduce the pupil size prior to exposure flash and shutter actuation.

11 Claims, 4 Drawing Figures

APPARATUS AND METHOD FOR MINIMIZING RED-EYE IN FLASH PHOTOGRAPHY

BACKGROUND OF THE INVENTION

1. Field of the Invention

The present invention relates to flash photography and more particularly to photographic apparatus, such as still cameras and flash attachments, that are constructed to minimize a "red-eye" phenomenon wherein an objectionable red dot can be observed in the subject's eye in some flash photographs.

2. Brief Description of the Prior Art

Since the early stages of photography, there has been a desire by consumers, and thus camera designers, for more compact cameras. However, as camera designs have become more and more compact, one distractive artifact has become more pronounced, specifically, the existence in some flash photographs, of a bright red dot aligned with the pupils of the subject's eyes. Studies have indicated that the likelihood and severity of this effect, termed "red-eye" by those skilled in the art, increases with decreases in the flash-to-lens separation of the photographic system. Thus the red-eye effect has imposed a serious problem in attempting to meet the strong desire for more compact cameras.

Previous design solutions to this problem have all invoked the approach of increasing the camera's flash-to-lens spacing. Thus flash extenders were provided for cameras adapted to use flashcubes and magicube flash units. An elongated, piezoelectrically-activated flash-lamp unit provided another implementation of this approach, constituting a "built-in" flash extender. With evolving improvements in electronic flash technology, it has become desirable to build in or attach electronic flash units to cameras; and electronic flash units have been designed for attachment or, built-in in a telescoping fashion, to provide increased flash-to-lens spacing. However, this approach can increase the cost and complexity of the camera design. Thus, the approach of increasing flash-to-lens spacing still provides a severely limiting constraint in designing compact cameras.

SUMMARY OF THE INVENTION

The present invention provides an alternative to the "increased flash-to-lens spacing" approach for minimizing red-eye effects and is believed to constitute a significant contribution toward the design of more compact flash cameras.

Thus it is an object of the present invention to provide improved cameras and/or camera attachments adapted for flash photography with minimized red-eye artifacts. In general, this objective is implemented according to the present invention by providing a subject-conditioning pre-flash discrete from, and a predetermined period before, the camera's shutter actuation and exposure flash.

While pre-flash systems have heretofore been used in still cameras, e.g., to produce shutter control, electronic-flash-quenching or range-finding input signals, those pre-flash systems were neither envisioned for, nor suitable as, means for minimizing the red-eye effect. The pre-flash apparatus of the present invention can, in certain embodiments, also be used to provide signals for such exposure control or ranging functions. However, even in such combined-function embodiments, it has features that are significantly different from such prior art pre-flash systems.

BRIEF DESCRIPTION OF THE DRAWINGS

In the subsequent detailed description of preferred embodiments of the invention, reference is made to the attached drawings which form a part hereof and in which.

DETAILED DESCRIPTION OF THE PREFERRED EMBODIMENTS

Before proceeding with the description of specific embodiments of the present invention, some additional detail about the theorized cause of the red-eye effect and the philosophy of my approach for decreasing it will be helpful.

It is generally accepted that the red-eye effect is caused by light from the picture-taking flash that is reflected from the retina of the subject's eye. Thus, light from the flash is imaged at the retina where a fraction of it is reflected back out the pupil of the eye. If the eye were a perfect optical system, this light would be reflected entirely back into the flash source; however, it is not, and there is some spreading of this reflected light. Therefore, the retinal-reflected light can be coupled into a picture-taking lens that is located proximate the flash. Since the reflectivity of the retina is high in the red light portion of the visible light spectrum, the pupil spot recorded on the film imaged by the taking lens is highly red. Significant subject variations in susceptibility to red-eye have been noted; however, these can be explained by variability in retinal-reflectance, accomodation, pupil size and ocular optics of the subjects.

Whereas the prior art approach to minimizing red-eye has been to separate the flash and taking lens sufficiently that not much retinal-reflected light is coupled in the taking-lens, it is my approach to cause a reduction in size of the pupil prior to the picture-taking operation. Reducing the size of the pupil, i.e., the aperture of the eye, has two beneficial aspects in regard to red-eye reduction. First, the intensity of the flash light reflected by the retina is reduced significantly because such reflected light intensity varies as the square of the pupil aperture during flash light's entry. Second, the actual size of red-eye spot on a print is directly proportional to the size of the pupil during exit of the reflected light. Thus both size and intensity of the red-eye spot are decreased by reducing the pupil size. In tests with flash to lens spacings as low as 2.5 cm, I have observed that red-eye is minimized acceptably, for most subjects, when pupil diameters of 4 mm or less exist.

Figure 1:
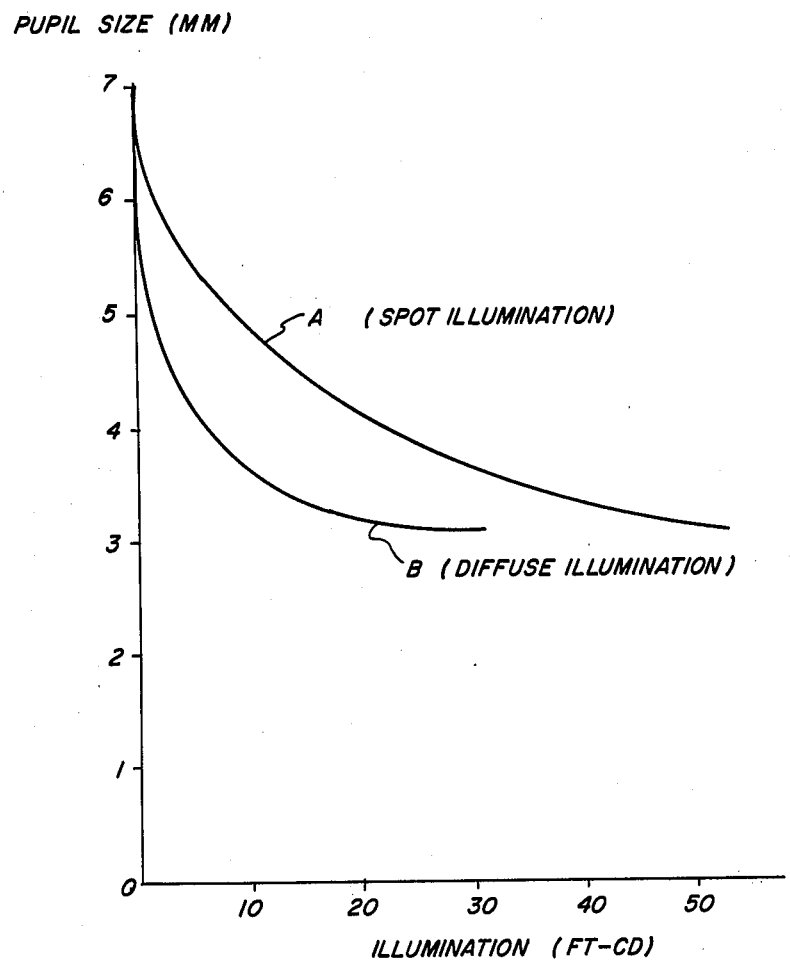
FIG. 1 is a graph indicating, at varying ambient illumination levels, the eye-pupil diameter of a subject having a high tendency to exhibit the red-eye effect.

Nominal pupil size (i.e., prior to any supplemental illumination) depends upon the ambient light conditions. FIG. 1 is a plot of this relation for a subject highly prone to exhibit the red-eye artifact in photographs. In FIG. 1, curve A indicates the measured pupil diameters for various subject plane illumination levels from an off-angle spot source and curve B indicates the pupil diameter for such illumination levels from a diffuse source. Thus, when illumination at the subject plane from a diffuse source is greater than about 5 ft-candles, pupil size would be less than 4 mm and red-eye effect artifacts would not be significant. However, as ambient light grows progressively less, the initial pupil size increases and the potential for significant red-eye effect increases.

Figure 2:
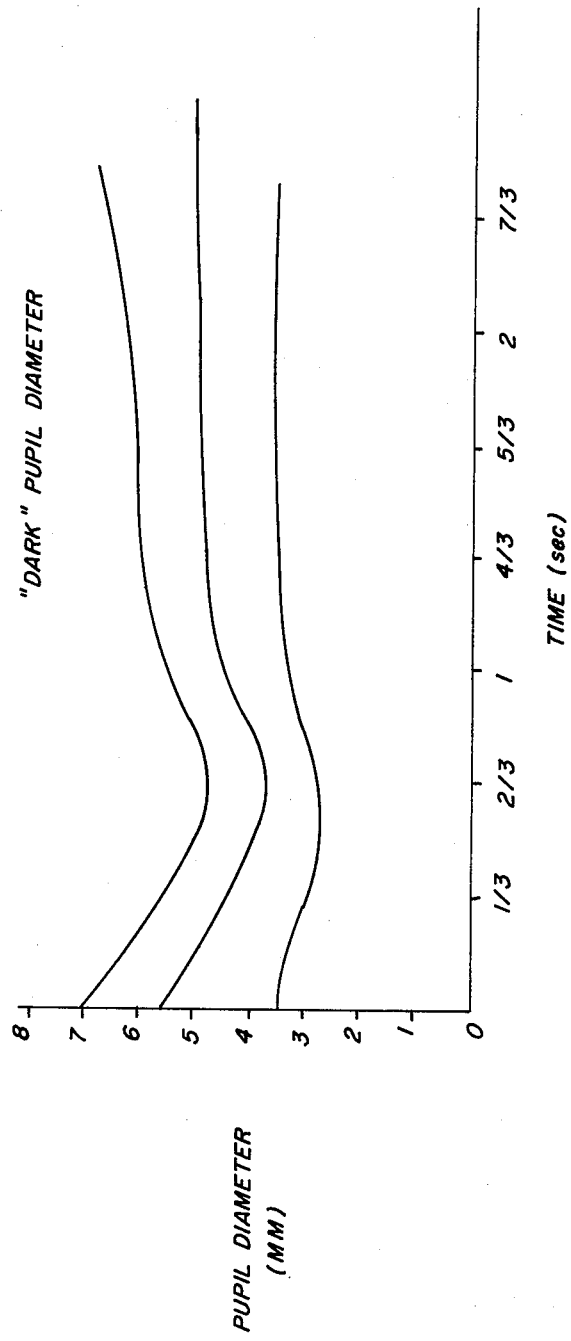
FIG. 2 is a graph indicating, for different ambient light conditions, eye-pupil response with respect to time after a pre-flash in accordance with the present invention.

For such low ambient light situations, the present invention provides a pulse of pre-flash illumination which stimulates the eye to substantially close-down its pupil prior to the commencement of the exposure period (i.e., the coincidence of exposure flash and a shutter-open condition) of the camera's picture-taking operation. A significant aspect of the present invention is that once stimulated by a pre-flash pulse, the dynamic response of the pupil continues to close the pupil down to some minimum size that depends on its initial size. This can be observed in FIG. 2 which plots the pupil response of a subject highly prone to exhibit the red-eye artifact versus time after a pre-flash pulse from a 40 μf/300 volt flash unit located 7 feet from the subject. Also, I have found that the pre-flash energy can be significantly less in magnitude than is required for a typical exposure flash. The parameters which are important with regard to such a subject-conditioning pre-flash are its total energy (i.e., its amplitude and duration) and particularly its time sequence relative to the commencement of the exposure period.

With respect to the magnitude of the pre-flash exposure pulse, I have found that it is highly desirable that the pulse generating energy be 1.5 joules or greater. A highly preferred pulse generating energy level for the pre-flash is at least about 3 joules or greater. It is presently preferred that the above-described flash energy be transmitted within a short period, e.g. about 1 millisecond; however, pulses of other durations are useful, if the pulse amplitude is sufficiently high. Although there appears to be some overall integrating effect of the total pre-flash illumination energy received by the eye, shorter, higher-amplitude pulses are deemed more efficient for purpose of the present invention. Because initial pupil diameter varies with ambient conditions, it may be desirable in some applications to provide adjustment of the pre-flash pulse's energy based on ambient light conditions.

The interval between the initiation of the pre-flash pulse and the initiation of the exposure period is very important. I have noted that, in general, a minimum pupil size will be reached within about 0.65 seconds after the pre-flash pulse, fairly independently of initial pupil diameter. This minimum pupil size will not be constant, but will depend on ambient light conditions prior to the pre-flash. Nevertheless, I have observed (see FIG. 2) that for most scene light conditions wherein a flash picture would be taken, the maximum corrective effect attainable will be achieved within about 0.65 seconds; and, it is highly preferred that the interval between pre-flash and the exposure period not exceed 0.65 seconds. Delays exceeding 0.65 seconds can in some conditions allow reopening of the pupil and, in any event, provide the subject more time to react (e.g., move) during the exposure period. Thus about 0.65 seconds is a highly preferred maximum limit for the pre-flash to exposure period interval.

In any particular picture-taking operation, the optimum delay period between the subject-conditioning pre-flash and exposure-flash would, of course, depend on the ambient light level of the scene. That is, a full 0.65-second period might be optimum in very low ambient scene light conditions; however, a lesser period might be adequate or preferred in somewhat higher ambient scene light conditions because of smaller initial size of the pupil. Thus the interval between pre-flash and the picture-taking operation could be adjustable depending on ambient light level, or it could be pre-set in the apparatus circuitry at some level designed to achieve good results in most situations. I have found that any interval within the range from about 0.3 to 0.65 seconds provides a substantial, i.e., significantly helpful, reduction in subject eye-pupil diameter. A particularly preferred range for this interval is from about 0.35 to 0.60 seconds. Also it has been noted that substantially all subjects will complete their first blink reaction to a pre-flash well before 0.3 seconds, thus the optimum range noted above comfortably avoids this blink consideration.

Having now described the philosophy and general and preferred parameters for practice of the present invention, specfic apparatus embodiments for implementing the invention will be described. One convenient and preferred mode of implementing such a pre-flash is with the same flash unit as is utilized for the subsequent exposure-flash.

Figure 3:
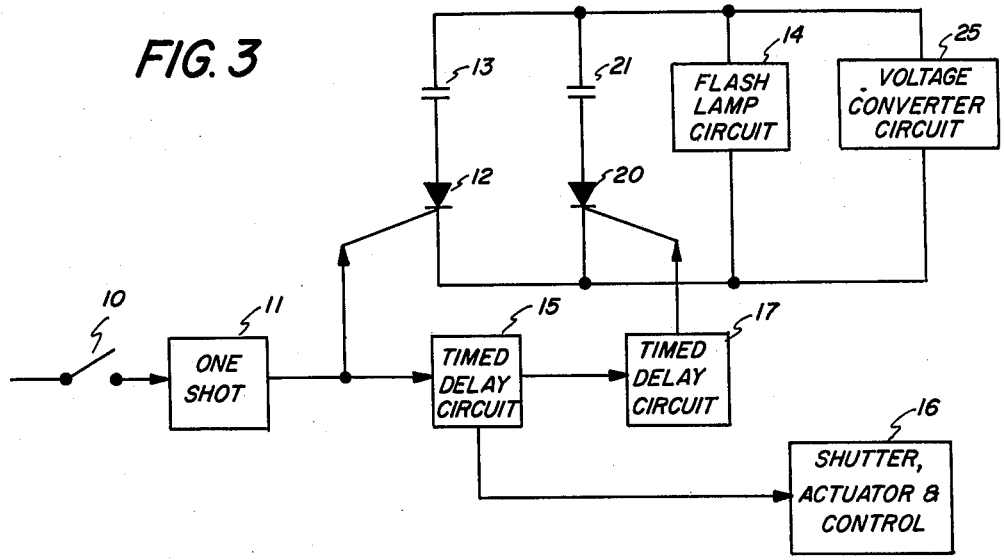
FIG. 3 is a schematic illustration of one embodiment for practice of the present invention.

FIG. 3 discloses one embodiment of photographic apparatus, e.g. a still camera with an electronic flash system, constructed for practice of the present invention. As shown in FIG. 3, the apparatus includes an actuating switch 10 in a normally open condition and adapted to be closed by the camera operator, e.g., by depressing an actuating button (commonly termed the "shutter release") on the camera exterior (not shown). The closure of switch 10 actuates a conventional monostable (i.e., one shot) multivibrator circuit 11 which is designed to provide a first electrical pulse of predetermined amplitude and duration.

The first pulse from one shot circuit 11 fires silicon control rectifier 12 causing pre-flash capacitior 13 to discharge through the low voltage winding of the conventional flash lamp circuit 14. Thus a pulse of pre-flash illumination having a duration determined by the duration of the first electrical pulse from one shot multivibrator 11 and an amplitude determined by the energizing voltage and capacitance of capacitor 13 is provided to initiate eye-pupil closure prior to the exposure period.

The leading edge of the pulse from circuit 11 also actuates a first time delay circuit 15, which can be a conventional, self-resetting timer circuit, adapted to provide a second actuating pulse, after a predetermined period following its actuation. The second actuating pulse from circuit 15 is applied to a shutter, actuator and control means 16 and to second time delay circuit 17. The shutter, actuator and control means can be any of the many known electro-mechanical systems that are adapted to effect opening of a camera aperture in response to an electrical signal and closure after an exposure period (e.g., fixed or determined by scene light conditions). To accommodate for opening time (e.g., a shutter's opening movement), the second time delay circuit 17, which can be a timer circuit similar to circuit 15, provides a second predetermined time delay (following its actuation by the pulse from circuit 15) and then provides an actuating pulse to silicon controlled rectifier 20. When fired by the pulse from circuit 17, silicon controlled rectifier 20 discharges capacitor 21 to effect an exposure flash of flash lamp circuit 14. Both of capacitors 13 and 21 are charged in a conventional manner, e.g., by batteries via a voltage converter circuit 25.

Figure 4:
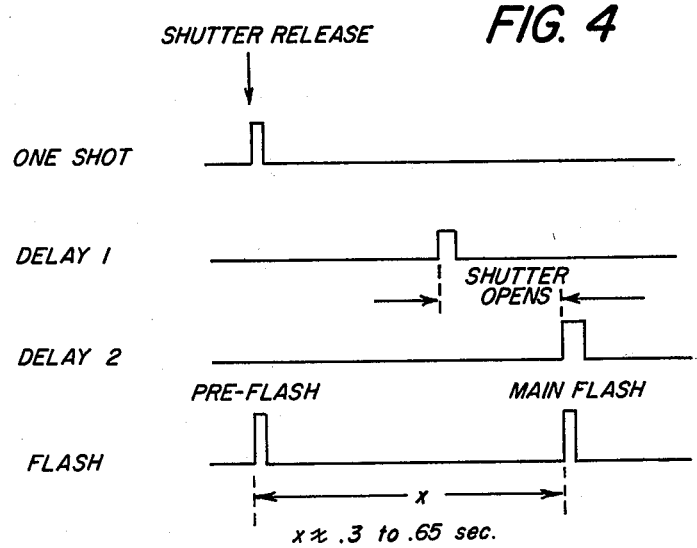
FIG. 4 is a diagram illustrating the time relation of the flash and shutter actuations effected by the embodiment of FIG. 3.

Referring now to FIG. 4, as well as FIG. 3, the timing sequence of pre-flash and main flash according to the illustrated embodiment of the invention will be explained. Thus when the apparatus is conditioned to its flash mode (either by operator selection or automatically by light sensors, not shown), the operation of the shutter release closes switch 10. The resulting pulse from one shot circuit 11 controls a pre-flash of duration and amplitude such as described above; and a predetermined period X after the initiation of such pre-flash pulse, an exposure flash is actuated by time delay circuit 17 to commence the exposure period. As described above, I have found that it is desirable to select the value of X within the range of about 0.3 seconds to 0.65 seconds and preferably within the range of about 0.35 to about 0.60 seconds.

It will be appreciated by those skilled in the art that various other embodiments can be provided to implement the present invention. For example, the second time delay circuit could be eliminated by providing for a shutter open signal, from circuit 16, to trigger the main exposure flash. Also, the flash lamp circuit 14 can be of the known kind which self-quenches in response to scene light conditions rather than terminating exposure via shutter control. Many other variations will occur to those skilled in the art and are deemed within the scope of the present invention to the extent they utilize the benefit of the present invention.

The invention has been described in detail with particular reference to certain preferred embodiments thereof, but it will be understood that variations and modifications can be effected within the spirit and scope of the invention.

What is claimed is:

1. In photographic apparatus for recording still pictures with supplementary illumination and including shutter means actuatable to an aperture-open condition and to an aperture-closed condition, flash means actuatable for providing supplementary illumination and means for actuating said shutter and flash means to initiate and terminate an exposure period of a picture-taking operation, the improvement comprising means for providing a subject-conditioning, illumination pulse which is of a predetermined energy and commences a predetermined period prior to the initiation of said exposure period to effect a substantial reduction of subject's eye-pupil diameter, said predetermined period having a magnitude in the range of from about 0.35 to about 0.60 seconds.

2. In photographic apparatus for recording still pictures with supplementary illumination and including shutter means actuatable to an aperture-open condition and to an aperture-closed condition, flash means actuatable for providing supplementary illumination and means for actuating said shutter and flash means to initiate and terminate an exposure period of a picture-taking operation, the improvement comprising means for providng a subject-conditioning, illumination pulse which is of a predetermined energy and commences a predetermined period prior to the initiation of said exposure period to effect a substantial reduction of subject's eye-pupil diameter, the generating energy for said illuminating pulse being at least 1.5 joules.

3. In photographic apparatus for recording still pictures with supplementary illumination and including shutter means actuatable to an aperture-open condition and to an aperture-closed condition, flash means actuatable for providing supplementary illumination and means for actuating said shutter and flash means to initiate and terminate an exposure period of a picture-taking operation, the improvement comprising means for providing a subject-conditioning, illumination pulse which is of a predetermined energy and commences a predetermined period prior to the initiation of said exposure period to effect a substantial reduction of subject's eye-pupil diameter, the generating energy for said illumination pulse being about 3.0 joules and said subject conditioning pulse being of about 1 millisecond duration.

4. The invention defined in claims 1, 2 or 3 including means for adjusting said predetermined period.

5. For use with photographic apparatus of the type adapted for recording still pictures and having shutter means actuatable to a light-blocking and to a light-passing condition and means for actuating said shutter means to effect a picture-taking operation, an improved flash device for providing supplementary illumination during said picture-taking operation, said device comprising an actuatable source of flash illumination and flash control means, operatively associated with said flash illumination source and connectable with said actuating means of said photographic apparatus, for providing a first subject-conditioning flash pulse and second scene-illuminating flash pulse during a picture-taking operation, said first pulse preceding said second pulse by a period sufficient to allow a substantial reduction of subject's eye-pupil diameter.

6. The invention defined in claim 5 wherein the magnitude of said period is in the range of from about 0.35 to about 0.60 seconds.

7. The invention defined in claim 5 further including means for adjusting said period between said subject-conditioning flash pulse and said scene-illuminating flash pulse.

8. The invention defined in claim 5 wherein said first pulse has a generating energy of about 3.0 joules and a duration of about 1 millisecond.

9. An improved method for flash photographing subjects in a manner minimizing red-eye artifacts, said method comprising pre-flashing the scene to be photographed with a subject-conditioning flash pulse and, within a period in the range from about 0.3 to about 0.65 seconds after said light pulse, effecting picture-taking flash illumination and recording.

10. The invention defined in claim 9 wherein said subject conditioning light pulse has a generating energy of from about 1.5 to 3.0 joules.

11. The invention defined in claim 9 wherein said subject-conditioning light pulse has a duration of about 1 millisecond.

* * * * *